United States Patent [19]

Meier

[11] 4,064,089

[45] Dec. 20, 1977

[54] ACCELERATED MELAMINE-ALDEHYDE RESIN AND METHOD OF MAKING A FAST-CURING LAMINATE THEREWITH

[75] Inventor: Joseph F. Meier, Export, Pa.

[73] Assignee: Westinghouse Electric Corporation, Pittsburgh, Pa.

[21] Appl. No.: 363,775

[22] Filed: May 24, 1973

[51] Int. Cl.$^2$ .................... C08G 12/32; C08L 61/28
[52] U.S. Cl. ......................... 260/29.4 R; 156/335; 260/33.4 R; 260/67.6 R; 428/530
[58] Field of Search ................ 260/67.6 R, 29.4 R

[56] References Cited

U.S. PATENT DOCUMENTS

| | | | |
|---|---|---|---|
| 2,467,280 | 4/1949 | Walter | 260/67.6 R |
| 3,148,937 | 9/1964 | Ross et al. | 260/67.6 R X |
| 3,839,289 | 10/1974 | Waitkus | 260/67.6 R X |

OTHER PUBLICATIONS

*Encyclopedia of Polymer Science and Technology,* Interscience Publischers, (1965), vol. 9, p. 835.

Primary Examiner—Howard E. Schain
Assistant Examiner—W. C. Danison, Jr.
Attorney, Agent, or Firm—A. Mich, Jr.; R. D. Fuerle

[57] ABSTRACT

An accelerated melamine-aldehyde resin is made by mixing about 0.001 to about 2% of a free-radical generator into the resin. A laminate is made by preparing a composition of an aldehyde and melamine in a mole ratio of about 1.5 to about 2.0, adjusting the pH of the composition to about 7 to about 9, heating the composition until a sample of it produces a positive hydrophobe in ice water, mixing about 0.001 to about 2% of a free-radical generator and up to about 80 phr of a solvent into the composition, coating paper with the composition to a weight ratio of coated paper to uncoated paper of about 1.2 to about 2.5, drying the composition and partially curing the compositin, stacking the coated paper, and curing the stack under heat and pressure.

15 Claims, No Drawings

ACCELERATED MELAMINE-ALDEHYDE RESIN AND METHOD OF MAKING A FAST-CURING LAMINATE THEREWITH

BACKGROUND OF THE INVENTION

Laminates are made by coating sheets of paper with melamine-aldehyde resin and other sheets with phenol-aldehyde resin and drying and partially curing the sheets in ovens. Stacks are formed with a melamine-aldehyde treated overlay sheet on top, a melamine-aldehyde treated print sheet next, then typically about seven phenol-aldehyde treated sheets. The stacks are then cured under heat and pressure in a press at about 800 to 1200 psi to produce the laminate.

The speed at which laminates can be made is largely determined by the amount of time required to cure the slowest-curing resin. Until now, the slowest-curing resin was the phenol-aldehyde resin.

However, it has recently been discovered that water soluble carbonates and bicarbonates will accelerate the curing of phenol-aldehyde resins without adverse effects. A full description of the accelerated phenol-aldehyde resins is given in my copending application, Ser. No. 363,774, filed of even date, now U.S. Pat. No. 3,897,589, titled "Laminate Made With Accelerated Melamine-Aldehyde Resin And Accelerated Phenol-Aldehyde Resin And Method Of Making It," and incorporated herein by reference.

Since the discovery of those accelerated phenol-aldehyde resins the melamine-aldehyde resin is now the slowest-curing resin.

Efforts have been made to accelerate the curing of melamine-aldehyde resins, but many of the compounds which have accelerated the curing have also produced adverse side effects which render them unacceptable. These adverse side effects include sticking to the pressing plates, failure to pass a hot water-hot wax test, delamination during a 2 hour water boil test, lack of resin stability during storage, and various other effects.

SUMMARY OF THE INVENTION

I have found that about 0.001 to about 2% (all percentages herein are by weight unless otherwise indicated) of a free-radical generator will decrease the cure time of a melamine-aldehyde resin by about 10% or more without adverse effects. The melamine-aldehyde compositions of this invention are stable and storable at room temperature for about 3 days. The melamine-aldehyde laminates made therefrom do not stick to the pressing plates and, quite unexpectedly, equal or surpass prior laminates in the hot water-hot wax test and show no evidence of delamination during the 2 hour water boil test prescribed by NEMA.

DESCRIPTION OF THE INVENTION

To prepare laminates according to this invention, a composition of an aldehyde and melamine is prepared preferably in a mole ratio of about 1.5 to about 2.0. Suitable aldehydes include formaldehyde, acetaldehyde, propionaldehyde, furfuraldehyde, benzaldehyde, glyoxal, methylglyoxal, etc., and mixtures thereof. Formaldehyde is preferred as the resulting resin is less expensive, has good gloss and abrasion resistance, and can readily be plasticized to give an adequate degree of flexibility to the laminate.

The pH of the composition is then adjusted to between about 7 and 9, preferably, for best results, between about 8 and about 8.7. The pH adjustment may be made by adding any base to the composition which will not otherwise interfere with the making of the laminate nor detract from its properties. Suitable bases include sodium hydroxide, sodium carbonate, sodium bicarbonate, other alkali or alkaline earth metal hydroxides, carbonates, and bicarbonate, etc. Sodium hydroxide is preferred as only small amounts of it are needed and it is relatively inexpensive. Typically, about 0.025 to about 1.5 phr (parts per hundred parts resin where "resin" is the weight of melamine and aldehyde), and preferably about 0.1 to about 0.25 phr, of sodium hydroxide is needed to make the pH adjustment.

The composition is then heated until a sample taken therefrom produces a positive hydrophobe in ice water at 4° C. A positive hydrophobe is a cloudiness or precipitation which occurs when the sample is placed in ice water. Typically, the composition will be heated at about 50° to about 100° for about ½ to about 3 hours, before a positive hydrophobe occurs. The time to obtain hydrophobe is determined by the pH and temperature of reaction.

Preferably, at this time about 10 to about 20 phr of a plasticizer may be added to the composition to impart flexibility to the laminate. Suitable plasticizers include corn syrup, corn oil, methyl glucoside, etc. A mixture of ortho and para toluene sulfonamides sold by Monsanto Chemical Co. under the trademark "Santicizer 9" is preferred because it reacts into the resin and is less sensitive to hydrolysis or swelling on exposure to boiling water.

Various other optional ingredients may also be added to the composition. For example, up to about 0.5 phr preferably about 0.1 to about 0.2) of an anti-static agent may be added to decrease static electricity between sheets of finished laminate. Anti-static agents are sold under trade names and are well known to the art. Other optional ingredients include dyes, etc. as is known to the art.

Up to about 80 phr of a solvent may be added to the resin composition to lower its viscosity so that it can be easily applied to the substrate by dipping and passing through squeeze rolls. About 25 to about 50 phr of a solvent is preferably added to the composition as that amount of solvent generally produces a composition which is easy to work with yet viscous enough to adhere to the substrate well. Suitable solvents for the resin include water, methanol, tetrahydrofuran, ethyl alcohol, isopropyl alcohol, butanol, etc. and mixtures thereof. Water containing up to about 8% methanol is preferred as it is inexpensive, does not produce hazardous vapors, and improves resin storage stability. The solvent may also be added before heating to a positive hydrophobe although that is not preferred as solvent may evaporate and the true hydrophobe value may be masked, leading in some cases to a resin with insufficient storage stability.

About 0.001 to about 2% (based on the resin) of a free-radical generator which is soluble in the composition is added to the composition. About 0.1 to about 0.5% (based on the resin) of the free-radical generator is preferred for best results. Suitable free-radical generators include peroxides such as dicumyl peroxide, t-butyl perbenzoate; organic hydroperoxides such as t-butyl hydroperoxide and cumene hydroperoxide, and persulfates such as sodium or potassium persulfate. The preferred free-radical generators which produce the best resins are t-butyl hydroperoxide, and potassium persulfate. Mixtures of free-radical generators may also be used.

A substrate is then coated with the composition. This may be done by spraying, painting, or other methods but is is most advantageously accomplished by immersing or dipping the substrate in the resin composition and passing it through squeeze rolls. The ratio of coated substrate to uncoated substrate should be about 1.2 to about 2.5, and preferably, for best results it is about 1.6 to about 1.8.

The substrate may be any type of paper or woven or matted cloth which will absorb or adsorb the resin. Examples include kraft paper, alpha-cellulose paper, any color print paper, cotton cloth, glass cloth, synthetic cloth such as polyethylene terephthalate, etc. The substrate for the outside sheet of the laminate is preferably alpha-cellulose paper as, after cure, it is clear and transparent, does not obscure the print, and offers a high degree of abrasion resistance to the print sheet. The substrate sheet immediately beneath the outside sheet is preferably a print paper, as that permits the laminate to have various decorative designs. The thickness of each substrate is generally about 0.5 to about 20 mils as this range is sufficient to hold the desired amount of resin, but is not excessively thick. The preferred thickness of the substrate is about 3 to about 15 mils. The substrate is typically taken from a roll about 4 to about 60 inches wide.

The coated substrate is then dryed and the resin partially cured so that it is non-blocking (i.e., non-sticky). This may be done in an oven at about 100° to about 325° F. Usually, about 5 to about 15 minutes at about 90° to about 150° F is sufficient to obtain the desired treating parameters, which have been established through experience as being most desirable. After drying the percent volatiles remaining should preferably equal about 3.5 to about 5.5%. The coated substrate may then be cut into sheets and stored for use.

The coated overlay and print sheets are stacked with sheets of a phenolic-aldehyde impregnated substrate. A commonly used stacking arrangement is 1 sheet of melamine-aldehyde impregnated alpha-cellulose binder, 1 sheet of melamine-aldehyde impregnated print paper, and 7 sheets of phenolic-aldehyde impregnated kraft paper used as the core of the laminate. The phenolic-aldehyde resin must, of course, be an accelerated resin or it will not cure completely in the time at the temperature allowed for the melamine-aldehyde resin.

A number of laminates are then stacked together separated by spacers, placed in a press and cured at about 275° to about 315° C and about 800 to about 1200 psi for about 30 to about 70 minutes.

The resulting laminates may be abraded on the phenolic surface and glued to heavier boards for use as counter-tops, table tops, decorative panels, etc. The following examples further illustrate this invention.

EXAMPLE I

A melamine resin consisting of 224 grams of melamine, 240 grams formalin, 130 grams water and 4-8 grams NaOH was prepared by heating the ingredients at reflux (or 100° C) until a positive hydrophobe was obtained in ice water. The resin, designated as the control, was cooled, to room temperature and had 200% water dilutability and about 50% solids. No plasticizer or dye was added to the control resin.

Varying amounts of selected compounds were added to 20 gm portions of the control resin (i.e., each 20 gm portion was about 50% solids hence contained 10 gm solid resin) and heated in small glass light bulb blanks to 152°-154° C with an oil bath. The samples were stirred periodically and tested with a spatula. The "gel time" was defined as the time required for a long, brittle string to adhere to the spatula when it was withdrawn from the sample. The following table compares the gel time of a control specimen to the gel time of the control resin containing various free-radical generators. The measured gel times were usually reproducible within about 1 minute.

| Additive | % Additive (based on solids) | Gel Time (minutes) | Comment |
|---|---|---|---|
| None | — | 32, 29 | reaction proceeded smoothly |
| t-butyl hydroperoxide | 1.0 | 16¼ | reaction proceeded smoothly |
| t-butyl perbenzoate | 1.0 | 17, 16 | reaction proceeded smoothly |
| cumene hydroperoxide | 1.0 | 16½, 15¼ | reaction proceeded smoothly |
| potassium persulfate ($K_2S_2O_8$) | 0.12 | 17 | thickened after about 12 minutes and became sticky |
|  | 0.63 | 8 | milky after 5 ¼ minutes then solidified to a solid mass in liquid* |
|  | 1.0 | 6½ | some lumping after 3 minutes and milky in about 4 minutes |
| hydrogen peroxide ($H_2O_2$) | 0.2 | 16½ | — |
|  | 0.63 | 6½ | after 4 ½ minutes turned milky and gelled with some liquid present* |
|  | 1.0 | 5 | milky after 4 minutes and gelled while fluid present* |

*Before the water, methanol and unreacted formaldehyde could evaporate the resin portion gelled.

This example shows that the additives of this invention decrease the gel time of melamine-aldehyde resins. It is known that a decreased gel time will result in a shorter cure cycle.

EXAMPLE II

Using the procedure of Example I, additional samples were prepared, stored for 24 or 48 hours at room temperature to determine storage stability, then tested for gel time. The following table gives the results.

| Additive | % Additive (based on resin solids) | Gel Time After 24 Hrs. (mins.) | Gel Time After 49 Hrs. (mins.) | Comments After 24 Hours | Comments After 48 Hours |
|---|---|---|---|---|---|
| Control | — | 34½ | 29 | Clear | Slightly turbid |
| 70% t-butyl hydroperoxide | 1 | 15 | 13 | Clear | Slightly cloudier than control |
| cumene hydroperoxide | 1 | 15 | 12½ | Clear | Milky white and unstable |
| potassium | 0.14 | 14 | 12 | Clear | Very similar to |

| Additive | % Additive (based on resin solids) | Gel Time After 24 Hrs. (mins.) | Gel Time After 49 Hrs. (mins.) | Comments After 24 Hours | Comments After 48 Hours |
|---|---|---|---|---|---|
| persulfate | | | | | control |

This example demonstrates that the stability of the compositions of this invention is slightly decreased where t-butyl hydroperoxide or cumene hydroperoxide is used but remains the same as the control when potassium persulfate is used.

EXAMPLE III

Print sheets were dipped or painted with the following resin composition:

| | gms |
|---|---|
| Melamine | 224 |
| Formalin | 240 |
| Water | 130 |
| NaOH | 0.4–0.8 |

After heating to a positive hydrophobe in ice water the following ingredients were added:

| | gms. |
|---|---|
| Water | 150 |
| Methyl alcohol | 55 |

The coated papers were air dried for about 15 minutes, oven dried at 115° C for 5 minutes, cut to 6 inches by 6 inches, and stacks of 6 sheets were formed, weighed, and pressed at 1000 psi and 150° C for 5 minutes. Resin which was squeezed out around the edges was scraped off, the laminate reweighed, and the greenness calculated by expressing the amount squeezed out as a percentage of the initial weight. The gel time was determined by placing a 20 gm sample of resin in a light bulb blank and heating the mixture in an oil bath at 253° F. Gel time is taken as the time required to form long brittle strings on a spatula withdrawn periodically from the resin as described in Example I.

The % volatiles was determined by placing a weighed, treated sheet in an oven at 150° C for 5 minutes. After heating the sample is reweighed and the % volatile computed as follows:

$$\% \text{ volatile} = \frac{(\text{weight before heating} - \text{weight after heating})}{\text{weight before heating}} \times 100$$

The following table gives the results:

| Additive | Gel Time (minutes) | Weight Ratio-Coated Paper to Uncoated Paper | % Greenness | % Volatiles |
|---|---|---|---|---|
| None Control | 37 | 1.70 | 0.71 | 4.12 |
| 1% t-butyl hydroperoxide | 17½ | 1.68 | 1.03 | 4.17 |

The weight ratio, greenness and percent volatiles were all within acceptable limits indicating that the resin can be used to treat print paper in a normal fashion with no difficulties.

EXAMPLE IV

Example III was repeated using alpha-cellulose paper and the following resin composition:

| | gms |
|---|---|
| Melamine | 304 |
| Formaldehyde (37% formalin) | 390 |
| Water | 100 |
| NaOH | 0.4–0.8 |

After heating to a positive hydrophobe in ice water the resin was cooled and diluted with alcohol or an alcohol water mixture to adjust resin solids.

The diluted resin was modified with t-butyl hydroperoxide, cumene hydroperoxide or potassium persulfate and coated on α cellulose paper.

The following table gives the results:

| Additive | % Additive Based on Resin Solids | Weight Ratio Coated Paper To Uncoated Paper | % Greenness | % Volatiles |
|---|---|---|---|---|
| Control | — | 2.72 | 2.05 | 5.04 |
| Control | — | 2.78 | 5.06 | 5.06 |
| 70% t-butyl hydroperoxide | 1 | 2.78 | 2.9 | 6.05 |
| cumene hydroperoxide | 1 | 2.84 | 2.84 | 6.15 |
| potassium persulfate | 0.14 | 2.82 | 2.37 | 6.2 |

The weight ratio, greenness and percent volatiles were all within acceptable limits indicating that the resin can be used to treat α cellulose paper in a normal manner with no difficulties when compared to similar treatment with control resin.

EXAMPLE V

Laminates prepared according to Example IV at 260° F were tested for resistance to hot water and hot wax.*
Aluminum containers filled with wax heated to 180° C or with boiling water were placed on the laminates for 10 to 12 minutes. The surface was then carefully examined for small cracks.
*See NEMA standards for Laminated Thermosetting Decorative Sheets LD1-1904

The following table gives the results:

| Additive | % Additive (based on Resin Solids) | Resistance to Hot Water | Resistance to Hot Wax |
|---|---|---|---|
| Control | — | Excellent | Excellent |
| Cumene hydroperoxide | 1 | Excellent | Excellent. Slightly better than control. |
| 70% t-butyl hydroperoxide | 1 | Excellent | Excellent. Same as control. |
| Potassium persulfate | 0.14 | Excellent | Excellent. Same as control. |

EXAMPLE VI

Laminates prepared according to Example IV at 270° F for 7 minutes were tested for craze resistance. For each wet-dry craze cycle the laminates were placed face down over a beaker of boiling water and steam was allowed to impinge on the melamine treated surface for 15 minutes followed by drying in an oven at 105° for 15 minutes. After each cycle the laminates were examined visually and at 10X under a microscope for small cracks. The following table gives the results.

| Additive | % Additive Based on Resin Solids | After 1st Cycle | After 2nd Cycle | After 3rd Cycle | After 3 Cycles Plus 1 Hr. Steam & 1 Hr. at 105° C |
|---|---|---|---|---|---|
| Control | — | No change | A few small cracks | More cracks visible | Rather severely cracked |
| t-butyl hydroperoxide | 0.2 | No change | No change | No change | Several small cracks |
|  | 1.0 | No change | No change | No change | Several small cracks |
| cumene hydroperoxide | 0.2 | No change | No change | Several small cracks | Several small cracks |
|  | 1.0 | No change | No change | Several small cracks | Several small cracks |

The above table shows that laminates prepared from resins containing t-butyl hydroperoxide and cumene hydroperoxide exhibited superior craze resistance compared to laminates prepared from the control resin containing no such additives.

I claim:

1. A method of accelerating the cure of a resin consisting essentially of melamine and an aldehyde comprising mixing a solution of said resin having a pH between 7 and 9 with about 0.001 to about 2% (based on said resin) of a free-radical generator soluble in said resin before curing said resin.

2. A method according to claim 1 wherein said aldehyde is formaldehyde.

3. A method according to claim 1 wherein the mole ratio of said melamine to said aldehyde is about 1.5 to about 2.0.

4. A method according to claim 1 wherein the amount of said free-radical generator is about 0.1 to about 0.5% (based on said resin).

5. A method according to claim 1 wherein said free-radical generator is selected from the group consisting of water soluble peroxides, hydroperoxides, persulfates, and mixtures thereof.

6. A method according to claim 5 wherein said free-radical generator is selected from the group consisting of t-butyl hydroperoxide, cumene hydroperoxide, potassium persulfate, and mixtures thereof.

7. A composition comprising a solution of a resin consisting essentially of melamine and an aldehyde having a pH between 7 and 9 and containing about 0.001 to about 2% (based on said resin) of a soluble free-radical generator.

8. A composition according to claim 7 wherein said free-radical generator is selected from the group consisting of water soluble peroxides, hydroperoxides, persulfates, and mixtures thereof.

9. A composition according to claim 8 wherein said free-radical generator is selected from the group consisting of t-butyl hydroperoxide, cumene hydroperoxide, potassium persulfate, and mixtures thereof.

10. A composition according to claim 9 wherein the amount of said free-radical generator is about 0.1 to about 0.5% (based on said resin).

11. A composition according to claim 7 wherein the mole ratio of said aldehyde to said melamine is about 1.5 to about 2.0.

12. A method according to claim 1 wherein said pH is between 8 and 8.7.

13. A method according to claim 1 wherein said solution is formed from about 25 to about 50 phr of water containing up to about 8% methanol.

14. A composition according to claim 7 wherein said pH is between 8 and 8.7.

15. A composition according to claim 7 wherein said solution is formed from about 25 to about 50 phr of water containing up to about 8% methanol.

* * * * *